UNITED STATES PATENT OFFICE.

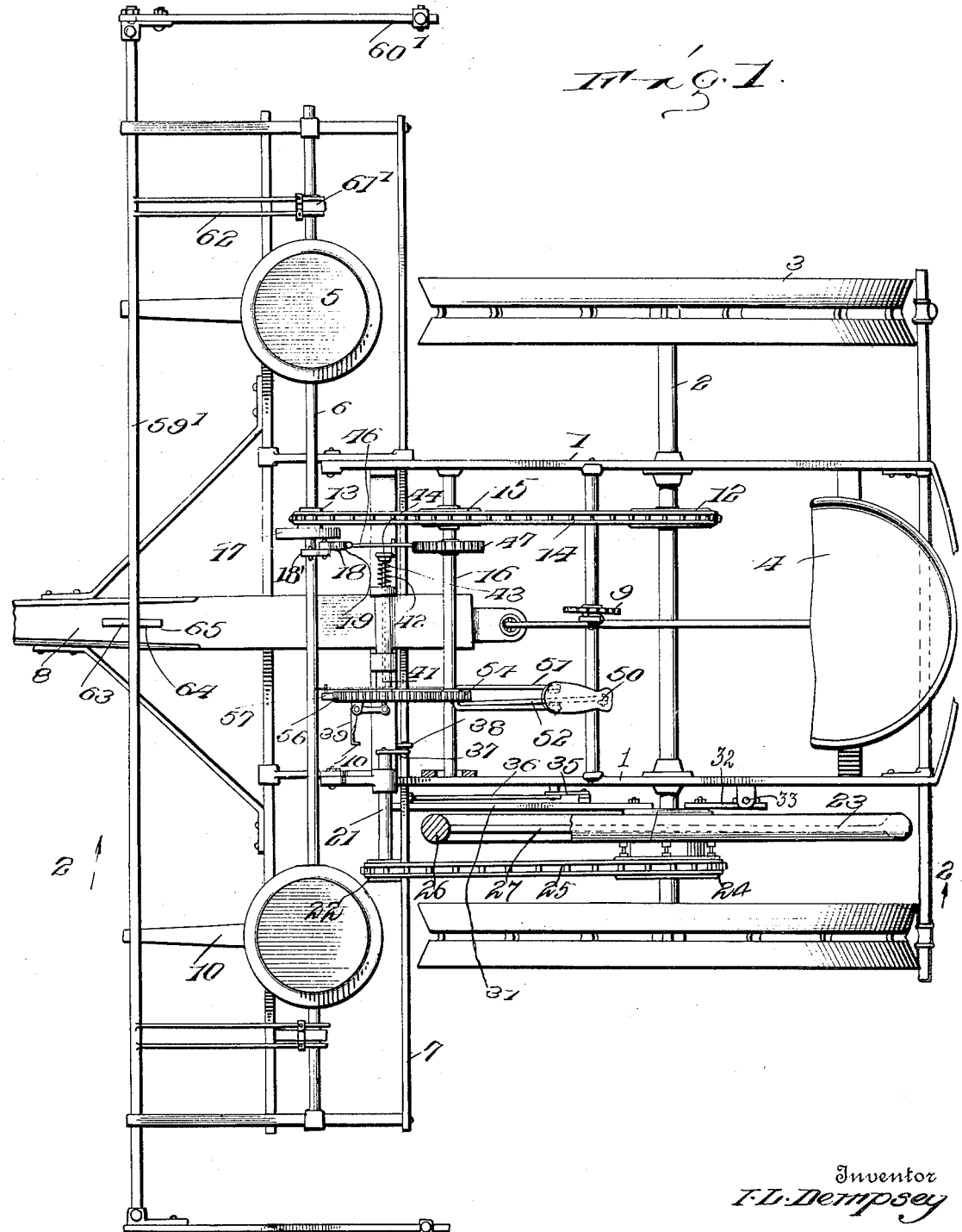

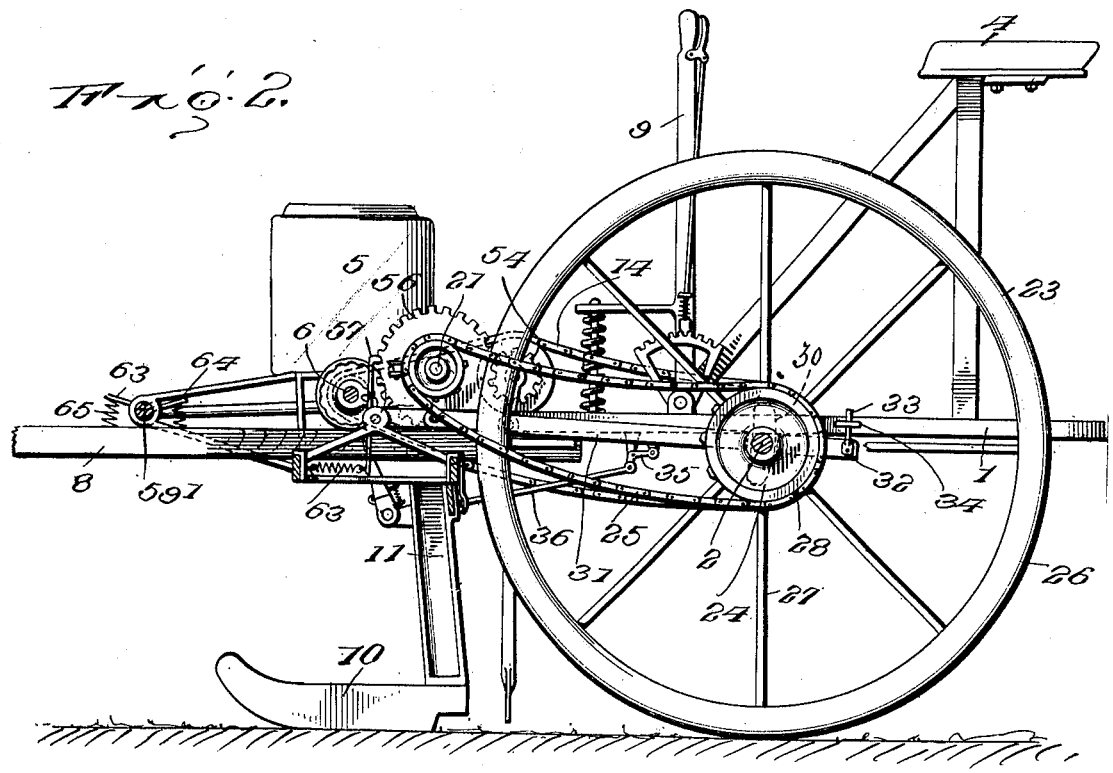
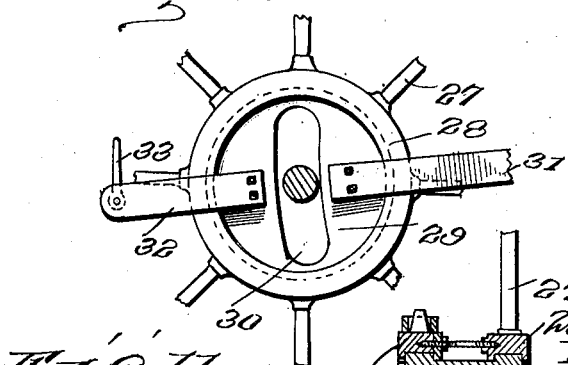
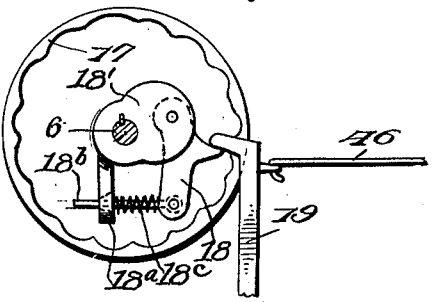
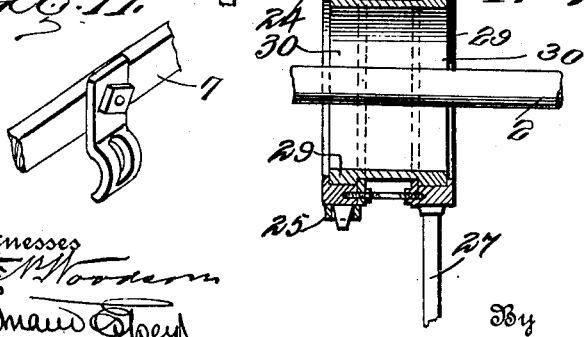

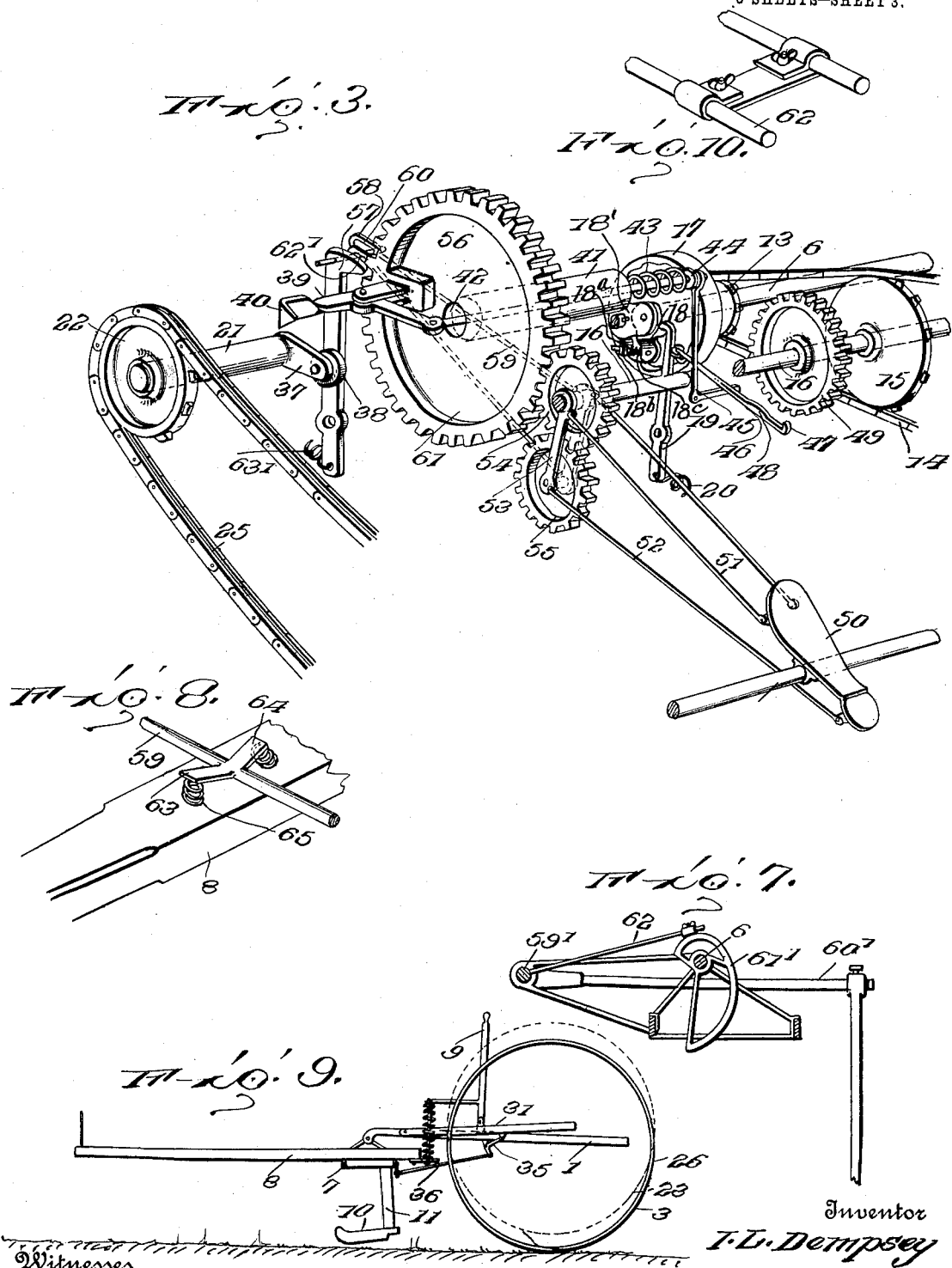

IRVING L. DEMPSEY, OF GALENA, MARYLAND.

WIRELESS CORN-PLANTER.

1,122,701.　　　　　Specification of Letters Patent.　　Patented Dec. 29, 1914.

Application filed April 1, 1912.　Serial No. 687,730.

*To all whom it may concern:*

Be it known that I, IRVING L. DEMPSEY, citizen of the United States, residing at Galena, in the county of Kent and State of Maryland, have invented certain new and useful Improvements in Wireless Corn-Planters, of which the following is a specification.

This invention has relation to wireless corn planters and has for its object to provide a timing device adapted to be operated at will for the purpose of advancing or retarding the action of the seed dropping mechanism with relation to the movement of the machine.

A further object of the invention is to provide in combination with a seed dropping mechanism a hill marking mechanism which is adapted to operate in a peculiar manner for indicating approximately where the hills are located in a field in order that the operator may observe the marks and thereby gain an idea as to whether the timing device should be operated to advance or retard the operation of the seed dropping mechanism.

With these and other objects in view the mechanism includes a treadle device adapted to be manipulated by the foot of the operator, thereby leaving his hands and arms free for control of the draft animals of the machine. This foot treadle mechanism is operatively connected with means for normally holding an operating shaft at a state of rest, but when the treadle mechanism is operated the shaft becomes active and operates the seed dropping mechanism of the seed boxes. Motion to this shaft is transmitted directly from a ground wheel which is independent of the traction wheels of the planter and which is arranged to be raised out of contact with the ground when the planter shoes are raised at the end of a row for the purpose of turning the machine, or when the machine is moved from field to field.

For a full understanding of the invention, reference is to be had to the following description and accompanying drawings in which:

Figure 1 is a top plan view of the planter. Fig. 2 is a side elevation of the same. Fig. 3 is a perspective view of parts of the retarding and advancing mechanism of the planter. Fig. 4 is a side elevation of the central portion of the ground wheel and attached parts. Fig. 5 is a transverse sectional portion of the view of said ground wheel. Fig. 6 is a detailed view of a clutch mechanism used upon the planter. Fig. 7 is a side elevation of a hill marker used upon the planter showing parts in section. Fig. 8 is a perspective view of an intermediate portion of said hill marking device. Fig. 9 is a diagrammatic side elevation of parts of the planter illustrating the manner in which a secondary traction wheel is elevated simultaneously with the elevation of the runners. Fig. 10 is a perspective view of the shiftable brace connecting the marker arms 62 and adapted to lie upon the face of the cam 61$^a$. Fig. 11 is a perspective view of a portion of the forward frame 7.

Corresponding and like parts are referred to in the following description and indicated in all the views of the accompanying drawings by the same reference characters.

The planter consists of a frame 1 which is mounted upon an axle 2, which is in turn mounted upon traction wheels 3 in the usual manner. The usual operator's seat 4 is mounted upon the frame 1. A shaft 6 is journaled in a forward frame 7 which is pivotally connected with the main frame 1, and the draft tongue 8 is connected with the frame 7 in the usual manner. The shaft 6 is operatively connected with the dropping mechanisms in the seed boxes 5 which are mounted upon the forward frame 7 in the usual manner. A lever mechanism 9 is mounted upon the frame 1, and is operatively connected with the tongue 8 in the usual manner and is adapted to swing the rear portion of the tongue, whereby the forward part of the frame 1 may be raised or lowered. Runners 10 are connected with the frame 7 in the usual manner and are adapted to operate as furrow openers. Tubes 11 leading down from the discharge outlets of the seed boxes 5 are connected at their lower ends with the said runners.

The parts of the planter hereinbefore described are those usually found in such structures, and it is therefore considered unnecessary to go into further detail in order to bring out the features involved in the subject matter of the present invention.

A sprocket wheel 12 is mounted upon the axle 2 and a sprocket wheel 13 is loosely journaled upon the shaft 6. A sprocket chain 14 is trained around the sprocket wheels 12 and 13 and passes over a sprocket wheel 15 which is fixed to a shaft 16 mounted upon the frame 1. This shaft 16 is not only journaled for rotation but it may be moved at one end upon its other end as a pivot in a forward and backward direction along the frame 1, see Fig. 1, the object of which will be explained hereinafter. A clutch member 17 is fixed to a side of the sprocket-wheel 13 so as to rotate therewith. A dog 18 is mounted on the shaft 6 to rotate therewith and is adapted to engage the member 17 and connect the shaft 6 therewith to operate the seed dropping mechanism in the manner well understood. The dog 18 is pivoted to a plate 18' secured to the shaft 6, said plate having an extension 18$^a$ through which a pin 18$^b$ passes loosely. The pin 18$^b$ is pivoted to the dog 18 and receives an expansible helical spring 18$^c$ by means of which the dog 18 is thrown into engagement with the clutch member 17 when such dog is released from all restraining influence. A pawl 19 is pivoted upon the frame 7 and is normally held by a spring 20 in engagement with the trip dog 18 to hold the same out of operative engagement with the clutch member 17; however when the pawl 19 is moved, as will be hereinafter explained, it permits the trip dog 18 to fall into engagement with the clutch member 17 whereby the shaft 6 is rotated in unison with the clutch member 17 and the wheel 13.

A shaft 21 is journaled for rotation upon the frame 1 and is provided with a sprocket wheel 22. An auxiliary traction wheel 23 of a peculiar form is mounted upon the axle 2 and is provided at its side with a sprocket wheel 24. A sprocket chain 25 is trained around the sprocket wheels 22 and 24 and is adapted to transmit rotary movement from the wheel 23 to the shaft 21. The wheel 23 is provided with a rim 26 which is circular in transverse section as best illustrated in Fig. 1 of the drawings. The rim of this wheel is connected by means of spokes 27 with a ring 28, see Fig. 4. A block 29 is loosely received in the ring 28 whereby the said ring may revolve about the periphery of the block. The block 29 is provided with an arcuate slot 30 which receives the axle 2 in a manner which is best shown in Figs. 4 and 5. An arm 31 is pivotally connected at one end with the frame 1 and at its other end is fixed to the block 29, whereby the said block is held against rotation. An arm 32 is fixed to the block 29 and is provided at its rear end with an upstanding pin 33 which is slidably received in a guide 34 carried by the frame 1, as shown in Fig. 2. The pin 33 is free to move up and down in the guide 34. A bell crank lever 35 is fulcrumed upon the frame 1 and has one end portion lying directly below the lower edge of the arm 31. A rod 36 is pivotally connected with the other end of the said bell crank lever and is also pivotally connected with an arm depending from the planter frame 7.

At this point it is deemed advisable to give a description of the operation of the wheel 23 in conjunction with the parts that are operatively connected with the tube 11. When the lever 9 is swung rearwardly and the rear end of the tongue 8 is moved in an upward direction, in consequence of the fact that the forward end of the said tongue is supported upon the neck yoke of the draft animals, the forward part of the frame 1 is raised. This carries the frame 7 up, which in turn lifts the tubes 11. Inasmuch as the frame 7 is pivotally connected with the forward end of the frame 1, there is a swinging movement between the two frames, and as the tubes 11 move in an upward direction, as indicated, the rod 36 is moved rearward longitudinally, whereby the bell crank lever 35 is swung upon its fulcrum. This movement on the part of the bell crank lever swings the arm 31 in an upward direction and the block 29 is moved in an upward direction transversely with relation to the axle 2; therefore the wheel 23 is moved in an upward direction so that its lower part is carried out of contact with the surface of the soil, and being relieved of frictional contact with the soil, the said wheel will come to a state of rest. At the same time runners 10 carried at the lower ends of the tubes 11 are lifted above the surface of the soil; therefore when the said runners are elevated the operation of the shaft 21 from the wheel 23 is interrupted. This operation is caused to take place at the end of each row when it is desired to turn the machine around, and also takes place when the machine is being moved from field to field. However, it may be accomplished at any time. It is obvious that when the lever 9 is swung in a forward direction that the movement of the parts will be reversed from that above described and the auxiliary traction wheel lowered into tractive engagement with the ground.

A crank arm 37 is carried at the inner end of the shaft 21, as shown best in Fig. 3, and is provided with a roller 38 which is adapted to operate as a tappet in conjunction with bell crank lever 39, which is fulcrumed upon ears projecting from a gear wheel 56 and has an end portion 40 disposed in the path of movement of the roller 38. During the rotation of the shaft 21 the bell crank lever 39 will rotate in a plane approximately parallel to the line of travel of the machine, while the crank 37 also rotates in a plane parallel with the line of movement of the machine and coincident with the plane of travel of the member 40. When the roller 38 engages the end portion 40 of the bell crank lever 39, the said end portion of the bell crank lever is moved in a forward direction; consequently the other end portion of the lever is moved in a direction transverse to the line of travel of the machine. The shaft 41 is journaled upon the frame 1 in line with shaft 21 and is hollow throughout its length. A rod 42 passes through the shaft 41 and is connected at one end with the end of the bell crank lever 39. A coiled spring 43 is seated at one end in the shaft 41 and at its other end bears against a stop button 44 mounted upon the rod 42. This spring is under tension with a tendency to retract the rod 42 and thus draw inward in the bell crank 39 and hold the end 40 normally in the path of movement of the roller 38. A bell crank lever 45 is fulcrumed upon the frame 1 and one end thereof is connected with the end of rod 42. The other end of the said bell crank lever 45 lies under the lower edge of a pawl 46. The inner end of pawl 46 is pivotally connected with the pawl 19 and is provided with a hooked end 47 and a hump 48 which is spaced from the said end 47. A gear wheel 49 is fixed to the shaft 16 and its teeth are adapted to be engaged by the end 47 of the pawl 46, and when the teeth of the said wheel come in contact with the hump 48, the pawl 46 is depressed to such an extent that its upstanding end is moved below the path of movement of the teeth of the wheel 49.

A treadle 50 is mounted upon the shaft of lever 9, and rods 51 operatively connect the forward part of the treadle with the shiftable end portion of the shaft 16. A rod 52 operatively connects the rear portion of the treadle 50 with the links 53 that are pivotally mounted upon the shaft 16. A gear wheel 54 is mounted upon the shaft 16 and meshes with the gear wheel 55 which is carried by the links 53. A gear wheel 56 is mounted upon the shaft 41 and is adapted to be engaged by either of the gear wheels 54 or 55. The rod 42 hereinbefore described passes through the center of the gear wheel 56. A pawl 57 is pivotally mounted upon the frame 1 and normally engages the teeth of the gear wheel 56, whereby the said gear wheel is restrained against rotation. This pawl has upon its side a pin 58. A rod 59 is pivotally connected at one end with the shaft 16 and is provided at its other end with a slot 60 which receives the pin 58 upon the pawl 57. A rod 61 is pivotally connected at one end with one of the links 53 and is provided at its other end with a slot 62' which loosely receives the said pin 58. The pawl 57 is normally held in engagement with the teeth of the wheel 56 by a spring 63', one end of which is connected with the pawl and the other end is connected with a part of frame 7. When the foot treadle 50 is swung so that the rods 51 are moved in a forward direction, the wheel 54 is carried into engagement with the teeth of the wheel 56, and rotates the latter. This wheel and shaft 16 are rotated by the engagement of the chain 14 with the wheel 15. At the same time that the upper end of the foot treadle 50 is moved forward the rear end of slot 60 engages the pin 58 and moves the pawl 57 forward so that the end of the said pawl disengages from the teeth of the wheel 56. When the rear end portion of the foot treadle 50 is depressed, the rods 51 and 52 move the wheel 54 out of engagement with and wheel 55 into engagement with the teeth of the wheel 56 and at the same time the rear end of slot 62' engages the pin 58, whereby the end of the pawl 57 is moved out of engagement with the teeth of wheel 56. It is of course understood that when the wheel 54 engages the wheel 56, the wheel 56 will be turned in one direction but when the wheel 55 engages the wheel 56, and the wheel 54 is out of engagement with the wheel 56, the wheel 56 will be rotated in a direction opposite to that in which it rotates when the wheel 54 is in engagement with the same. In the neutral position of the parts, the wheels 54 and 55 are both out of engagement with the gear wheel 56 and hence this gear wheel remains stationary and is held in position by the pawl 57, the spring 63' holding the pawl in the position illustrated in Fig. 3. The gear wheels 55 and 56, the rods 59 and 61 are for the purpose of advancing or retarding the tripping of the seed dropping mechanism and except for this function of retarding or advancing the instant of contact between the member 40 and the roller 38, they are not necessary to the operation of the machine.

The bell crank lever 39 is carried at the side of the wheel 56 as best shown in Fig. 3; therefore as the said wheel 56 is rotated in one direction or the other the position of the bell crank lever 39 with relation to the axis of the shaft 21 (which is in a constant state of rotation) is varied and by turning the wheel 56 the roller 38 may be caused to engage the end 40 of the lever 39 earlier or later, that is, the instant of engagement may be advanced or retarded, and this accomplishes the advancing or retarding of the operation of the seed dropping mechanism with relation to the movement of the machine. Therefore, it will be seen that a simple and an effective mechanism for operating the dropping devices of a planter is provided, that means is provided whereby the auxiliary traction wheel may be lifted out of engagement with the ground simultaneously with the elevation of the runners. By varying the diameter of the wheel 22, the rate of speed of rotation of the shaft 21 with relation to the rotation of the wheel 23 may be varied as occasion or conditions require. After the pawl 19 has been disengaged from the dog 18, as hereinbefore described, the parts carried by the shaft 41 are returned to their normal conditions by the spring 43.

The operation of that part of the invention which has been described is as follows: As the machine moves over the ground the traction wheels 3 will of course rotate, and if the auxiliary traction wheel 23 is depressed it also will rotate by engagement with the ground. This will cause a continuous rotation of the shaft 21 in a counterclockwise direction. As this shaft rotates, the roller 38 will strike the terminal end 40 of the tripping bell crank lever 39. This bell crank at this moment of engagement will be shifted against the force of spring 43. This shifting of the rod 42 shifts the bell crank lever 45, lifting the latch rod 46 into engagement with wheel 49 which at this time is also rotating in a counterclockwise direction. The engagement of the rod 46 with the teeth 49 causes a retraction of the pawl 19 out of engagement with the clutch member 18, and this in turn causes shaft 6 to be clutched to sprocket 13 and the seed planting mechanism to be actuated. The withdrawal of the dog 19 is merely momentary as almost immediately after the hook 47 has engaged the teeth 49, the hump 48 will be struck by the teeth 49 and the hook 47 again disengaged from the teeth permitting the pawl 19 to snap back to its original position where it will again engage with the member 18 in the rotation of the shaft 6. In other words, the rotation of the shaft 6 is dependent upon the engagement of the roller 38 with the trip 40. If now it is desired to advance the instant of seed dropping, the wheel 54 is engaged with wheel 56. This causes a rotation of the rotatable trip carrier wheel 56 in a clockwise direction and carries the tripping bell crank 39 in the direction toward the advancing roller 38. If it is desired to retard the instant of seed dropping then the wheel 54 is shifted out of engagement with the timing wheel 56 and the wheel 55 is shifted into such engagement. This communicates a reverse movement to wheel 56 and the tripping bell crank is carried in the same direction as the direction of travel of the roller 38, thus retarding the time of engagement between the two. Normally, of course, neither the wheel 54 or 55 is in engagement with the timing wheel 56 and under these circumstances the engagement between the roller 38 and the terminal end 40 of the trip bell crank occurs at regular intervals.

A shaft 59' is journaled upon the front frame 7 and extends transversely across the tongue 8. This shaft is provided at its ends with marker arms 60'. Cams 61' are mounted upon the shaft 6 and are arranged to rotate in unison with the same. Arms 62 are carried by the shaft 59' and lie against the peripheries of the cams 61'; therefore as the said cams 61' rotate the rear ends of the rods 62 will rise and fall, whereby the shaft 59' is rocked and the hill markers 61 are raised and lowered. As these hill markers move in a downward direction they strike the soil and make depressions therein which indicate approximately the droppings of the seed. Lugs 63 and 64 are fixed to the intermediate portion of the shaft 59', the lug 63 being forwardly depressed and the lug 64 rearwardly depressed. Coil springs 65 are interposed between these lugs and the tongue 8. These lugs and springs are adapted to control the rocking movement of the shaft 59'. That is to say, when the deep parts of the cams 61' are passing under the rear ends of the arms 62, the shaft 59' is turned so that the lug 63 presses the forward spring 65; therefore when the deep parts of the cams pass from under the rear ends of the arms 62 the tension of the spring 65 under the lug 63 causes the said shaft 59' to turn promptly, and, therefore, the markers 61 are caused to move rapidly toward the soil and enter the same, making the marks as indicated. At the same time, the lug 64 is swung down and compresses the rear spring 65; therefore after the markers 60' have made the marks in the soil, they are rapidly moved in an upward direction for a short distance under the tension of the spring 65 under the lug 64, and thus the markers are rapidly lifted from the soil and are not permitted to drag for any considerable distance in the same.

It will be noted that all the power to operate the seed dropping mechanism and shift the timing wheel 56 comes from the main traction wheels 3 but that the power for releasing the tripping mechanism comes entirely from the auxiliary traction wheel. Where the power of the main traction wheels is used to time the tripping mechanism, the tripping mechanism can not be actuated evenly, that is, at regular intervals so as to plant the seed even distances apart. The reason for this is that the main traction mechanism has to do considerable work and therefore there is considerable resistance to its rotation. This renders the wheels liable to slip on the ground and causes lost motion. Furthermore, these traction wheels accumulate soil in passing over wet ground and this soil gathered upon the circumference of the traction wheel will tend to give an irregular movement thereto and give an irregular timing.

The timing mechanism which I have devised is very sensitive and easily operated and hence it requires comparatively little traction power to operate. Very little strain therefore comes upon wheel 23 and hence this auxiliary traction wheel is not so liable to slip as the main traction wheels, particularly as it is so formed that it will not accumulate the soil. The rim of the auxiliary traction wheel is circular in transverse section so that it will not cling to the soil and gather the same. Furthermore the auxiliary traction wheel is so mounted as not to be affected by the weight of the machine and will hence accurately follow the contour of the ground and accurately operate the seed dropping mechanism. The timing mechanism or trip releasing mechanism it will be seen is entirely under the control of the auxiliary traction wheel and is entirely independent of the main driving mechanism. The device for advancing or retarding the instant of actuation of the seed dropping mechanism is entirely under the control of the operator and by its use the hills may be maintained in true check row alinement irrespective of the contour of the soil or other conditions. Inasmuch as the auxiliary traction wheel 23 is raised from the ground simultaneously with the lifting of the runners, the planter may be easily and quickly turned at the ends of rows. Furthermore it is easy to adjust the timing mechanism at the beginning of the planting and before the auxiliary traction wheel is lowered so that the planting may take place at any desired point.

The markers of the planter are controlled by the same shaft that controls the dropping of the seed; therefore the marks are made in the ground in exact line with the corn planted and show the location of every hill and when starting in to plant new rows, before setting the shoes into the ground, the operator can time the machine so that it will plant the first hills of the rows to be planted in line with the last ones in the rows just planted by turning the secondary timing wheel (which is free to rotate) either backward or forward as the case may require. When the machine is at rest the timing is done by hand.

What is claimed is:

1. In a planter, seed dropping mechanism, main traction wheels, an auxiliary traction wheel, a clutch adapted to operatively connect the seed dropping mechanism with the main traction wheels, means for holding the clutch from operation, tripping means connected to said holding means, means for operating the said tripping means normally out of operative engagement therewith and actuated by the main traction wheels, and means operatively connected to the auxiliary traction wheel for periodically connecting the trip operating means with said tripping means.

2. In a planter, seed dropping mechanism including a shaft, a clutch thereon comprising two members, main traction wheels operatively connected to one member of the clutch, means for holding the other clutch member normally disengaged from the first-named member, means for tripping said holding member, means for operating said tripping means actuated by the main traction wheels, an auxiliary traction wheel, and means periodically operated by the auxiliary traction wheel and operatively connected to the tripping means to shift the tripping means into engagement with its operating means.

3. In a planter, seed dropping mechanism, main traction wheels, means for operating the seed dropping mechanism from the main traction wheels normally disengaged from the seed dropping mechanism, means for operatively connecting said operating means with the seed dropping mechanism, means operated by the main traction wheels for operating said connecting means but normally out of engagement therewith, an auxiliary traction wheel, and means operated by the auxiliary traction wheel for periodically engaging the said connecting means with its traction operated means.

4. In a seed planter, main traction wheels, seed dropping mechanism including a shaft, a clutch thereon, comprising two members, means for driving one member of the clutch from the main traction wheels, means for holding the other member of the clutch normally disengaged from the first-named member, means for tripping the holding member to thereby permit the seed dropping mechanism to be driven by said driving means, means operated by the main traction wheels for actuating said tripping means but normally disengaged therefrom, an auxiliary traction wheel, and a shaft journaled on the planter and operatively connected to the auxiliary traction wheel, said shaft operatively engaging periodically the said tripping means to shift the tripping means into operative engagement with its actuating means.

5. In a planter, seed dropping mechanism, main traction wheels, a vertically movable auxiliary traction wheel, a clutch for operatively connecting the seed dropping mechanism with the main traction wheels, means for holding the clutch out of operation, means for tripping the holding means, means operatively connected to the main traction wheels for actuating said tripping means but normally out of engagement therewith, means driven by the auxiliary traction wheel periodically engaging said tripping means with its actuating means, and means for raising or lowering the auxiliary traction wheel into or out of contact with the ground.

6. In a planter, seed dropping means including a shaft, a clutch thereon, comprising two members, main traction wheels, means for driving one member of the clutch from the main traction wheels, means for holding the other member normally disengaged from the first-named member of the clutch, means for tripping the holding member, means operated by the main traction wheels for actuating said tripping means but normally out of engagement therewith, an auxiliary traction wheel, means periodically actuated by the auxiliary traction wheel, adapted to shift the tripping means into engagement with its actuating means, and manually controlled means for advancing or retarding the instant of operation of the said shifting means.

7. In a planter, seed dropping mechanism, a clutch comprising two members, one member being operatively connected to the seed dropping mechanism, main traction wheels operatively connected to the other member, means for holding the other member normally disengaged from the first-named member, means for tripping said holding means, means for actuating said tripping means operated from the said main traction wheels but normally out of engagement with the tripping means, and an auxiliary traction wheel operated means adapted periodically to shift the tripping means into operative engagement with its actuating means.

8. In a planter, main traction wheels, seed dropping mechanism, a clutch, one member of which is operatively connected to the seed dropping mechanism and the other member of which is connected to the main traction wheels, means for holding the members normally disengaged, means for tripping the holding member, means operated by the main traction wheels for actuating said tripping means but normally disconnected therefrom, a secondary traction means adapted to move the tripping means into operative engagement with its actuating means at predetermined intervals, and manually controlled means driven from the main traction wheels for varying the instant of engagement between the tripping means and its actuating means.

9. In a planter, main traction means, seed dropping mechanism, means for operatively connecting the seed dropping mechanism with the main traction means, means for holding said connecting means from operation, means for releasing the holding means and adapted to be operated by the main traction means, a secondary traction means adapted to periodically engage the releasing means with its actuating means at predetermined intervals, and manually controlled means operated by the main traction means for advancing or retarding the engagement of said releasing means with its actuating means.

10. In a planter having a seed dropping mechanism, a primary traction means for operating the seed dropping mechanism, a shaft journaled upon the planter and rotated by said primary traction means and movable in its bearings, means for moving said shaft manually, a shaft journaled upon the planter, a secondary traction means for rotating the last mentioned shaft, a wheel journaled upon the planter and adapted to be rotated from the first-mentioned shaft when the said shaft is moved into one position, a clutch device operatively connected with the seed dropping mechanism and having one of its members operatively connected with the primary traction means, means for normally holding the other clutch member out of engagement with the first-mentioned clutch member, and means carried by said wheel and adapted to be operated from the second-mentioned shaft at intervals for connecting the holding means of the last mentioned clutch with the first-mentioned shaft whereby the said second-named clutch member may be released.

11. In a planter, a main frame, main traction wheels supporting the same, a front frame pivotally connected thereto, a tongue connected to the front frame, seed dropping mechanism mounted upon the front frame, driving means for operating said seed dropping mechanism from the main traction wheels, but normally out of engagement with the seed dropping mechanism, means for connecting the driving means with the seed dropping mechanism, means for holding the connecting means from operation, means for tripping said holding means, means operated by the main traction wheels for actuating said tripping means but normally disengaged therefrom, an auxiliary traction wheel, means operated thereby for shifting said tripping means into operative engagement with its actuating means, and means for automatically elevating the auxiliary traction wheel out of contact with the ground when the front frame is raised.

12. In combination with a planter, including a wheel supported main frame, a tongue-bearing frame pivotally connected thereto, a lever mechanism mounted upon the main frame and operatively connected with the tongue-bearing frame to raise or lower the same, seed dropping mechanism mounted upon the tongue-bearing frame, means for driving the seed dropping mechanism from the wheels of the main frame but normally disengaged from the seed dropping mechanism, means for connecting the seed dropping mechanism with the driving means, means for holding said connecting means from operation, means for tripping said holding means, means actuated by the main traction wheels for actuating said tripping means but normally disengaged therefrom, an auxiliary wheel mounted upon the axle of the main frame, means operatively connected with said wheel for periodically shifting the tripping means into engagement with its actuating means, and means for automatically lifting the auxiliary wheel out of contact with the ground when the tongue-bearing frame is elevated 13. In a planter, seed dropping mechanism including a rotatable shaft, main traction wheels, clutch mechanism adapted to operatively connect the rotatable shaft with the main traction wheels, a toothed wheel operated by said main traction wheels, a tripping device normally holding the clutch out of operative position and including a member movable into engagement with the toothed wheel, said wheel acting to trip the clutch mechanism by engagement with said member, a lever adapted when shifted in one direction to shift said member into engagement with the toothed wheel, a member adapted to operatively engage with and adapted to shift said lever, a supplementary traction wheel, a shaft operatively connected to and rotated thereby, and an arm projecting from the shaft and adapted to engage said last-named member to thereby shift the tripping mechanism into engagement with the said first-named toothed wheel at predetermined intervals.

14. In a planter, seed dropping mechanism including a rotatable shaft, main traction wheels, a clutch mechanism adapted to operatively connect the rotatable shaft with the main traction wheels, means for holding the clutch out of operative position, a toothed wheel driven by the main traction wheels, a member connected to said holding means and movable into engagement with the toothed wheel whereby the holding means may be tripped, a tubular shaft, a toothed wheel mounted upon the tubular shaft, a rod extending through the toothed wheel, a bell crank lever having one arm connected to said rod and the other arm extending beneath the member whereby an actuation of the rod will move the member laterally into engagement with the toothed wheel, a bell crank lever carried upon the said toothed wheel and having one arm connected to the rod passing through the tubular shaft, a supplementary traction wheel, a shaft operatively connected thereto and having a projecting arm adapted in its travel to engage with the projecting arm of the last-named bell crank lever, and manually controlled means for shifting the gear wheel and tubular shaft in one or the other direction to thereby shift the position of the bell crank lever carried thereby with relation to the arm on the last-named shaft.

15. In a planter, seed dropping mechanism, main traction wheels, an auxiliary traction wheel rotating independently of the main traction wheels, means operated by the main traction wheel for driving the said dropping mechanism but normally disengaged from the latter, shiftable means for connecting said driving means with the said seed dropping mechanism, means driven by the main driving wheels for actuating said shifting means but normally out of disengagement therewith, and means operated by the auxiliary traction wheel for periodically engaging said shifting means with its actuating means.

16. In a planter, seed dropping mechanism, main traction wheels, an auxiliary traction wheel, means adapted to operatively connect the seed dropping mechanism with the main traction wheels, means for holding said connecting means out of operation, means adapted to trip said holding means and operated by the main traction wheels, and means operated by the auxiliary traction wheel for periodically connecting said tripping means with its actuating means.

17. In a planter, seed dropping mechanism, including a seed shaft, a clutch thereon, comprising two members, main traction wheels operatively connected to one of the members of the clutch, means for holding the clutch members normally disengaged, means for tripping said holding means, and including a rotatable element having an arm, and a rotatable element having an arm disposed in the path of movement of the first-named arm, one of said rotatable elements having gear-teeth, a shaft operatively driven from the main traction wheels, a gear wheel on the shaft adapted to mesh with said toothed element, a gear wheel meshing with the first-named gear-wheel and also adapted to be shifted into mesh with the toothed element, and manually controlled means for shifting either of the gear wheels into engagement with the toothed element to thereby rotate the toothed element in one direction or the other to shift the arm carried thereon toward or from the arm carried by the other rotatable element to thereby advance or retard the instant of operation of one arm by the other arm.

In testimony whereof I affix my signature in presence of two witnesses.

IRVING L. DEMPSEY. [L. S.]

Witnesses:
 CAYOT BEASTON,
 JESSE E. IRELAND.